(12) United States Patent
Heckel et al.

(10) Patent No.: US 11,491,552 B2
(45) Date of Patent: Nov. 8, 2022

(54) CUTTING TOOL AND METHOD FOR MACHINING A BEARING TUNNEL

(71) Applicant: Guehring KG, Albstadt (DE)

(72) Inventors: Gerd Heckel, Puschendorf (DE); Hans-Peter Hollfelder, Fuerth (DE); Juergen Thanner, Hilpoltstein (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 16/751,622

(22) Filed: Jan. 24, 2020

(65) Prior Publication Data

US 2020/0290129 A1   Sep. 17, 2020

Related U.S. Application Data

(63) Continuation of application No. PCT/EP2018/070397, filed on Jul. 27, 2018.

(30) Foreign Application Priority Data

Jul. 28, 2017   (DE) .................... 10 2017 213 046.6

(51) Int. Cl.
*B23B 29/034* (2006.01)

(52) U.S. Cl.
CPC .. *B23B 29/03446* (2013.01); *B23B 29/03417* (2013.01); *B23B 29/0341* (2013.01)

(58) Field of Classification Search
CPC .......... B23B 29/03414; B23B 29/0341; B23B 29/03421; B23B 29/03417;
(Continued)

(56) References Cited

U.S. PATENT DOCUMENTS

| 914,328 A | 3/1909 | Barnes |
| 2,374,325 A * | 4/1945 | Borek ................. B23B 29/0341 408/181 |

(Continued)

FOREIGN PATENT DOCUMENTS

| DE | 2257653 A1 * | 5/1974 | ....... B23B 29/03421 |
| DE | 24 05 694 A1 | 8/1975 | |

(Continued)

OTHER PUBLICATIONS

Description DE102004052211A1 (translation) obtained at https://worldwide.espacenet.com/ (last visited Feb. 24, 2021).*

(Continued)

*Primary Examiner* — Ryan Rufo
(74) *Attorney, Agent, or Firm* — Burr & Brown, PLLC

(57) ABSTRACT

The invention relates to a cutting tool comprising a main part that can be rotationally driven about a rotational axis, at least one cutting insert holder mounted on the main part such that it can be radially adjusted, and an adjusting device for adjusting the position of the cutting insert holder relative to the main part. The cutting insert holder is mounted in a guide recess in the main part such that it can be moved transversely, preferably radially, to the rotational axis, and the adjusting device has a control rod that is arranged axially movable inside the main part and supports the cutting insert holder. The cutting tool can be of the multi-point cutting tool type. The invention also relates to a method for machining a bearing tunnel by means of such a multi-point cutting tool.

19 Claims, 5 Drawing Sheets

(58) Field of Classification Search
CPC ........ B23B 29/03407; B23B 29/03446; B23B 29/03457; B23B 2229/08; B23B 2229/12; B23B 2220/445; B23C 5/2458
See application file for complete search history.

(56) References Cited

U.S. PATENT DOCUMENTS

| | | | | |
|---|---|---|---|---|
| 2,457,040 | A * | 12/1948 | Penn-Gaskell Hall | ................... B23B 29/03446 82/1.2 |
| 2,661,218 | A * | 12/1953 | Snow | ................ B23B 29/03414 279/6 |
| 3,044,323 | A * | 7/1962 | Sweeny | ............ B23B 29/03414 408/151 |
| 3,314,313 | A | 4/1967 | Murphy | |
| 3,405,049 | A | 10/1968 | Czubak | |
| 3,524,382 | A * | 8/1970 | Artaud | .............. B23B 29/03467 407/45 |
| 3,530,745 | A * | 9/1970 | Milewski | .......... B23B 29/03457 82/1.4 |
| 3,740,161 | A * | 6/1973 | Milewski | .......... B23B 29/03457 408/158 |
| 3,918,826 | A * | 11/1975 | Friedline | ........... B23B 29/03457 408/180 |
| 4,105,360 | A * | 8/1978 | Keller | ................... B23B 29/034 408/118 |
| 4,289,431 | A | 9/1981 | Berstein | |
| 4,428,704 | A | 1/1984 | Kalokhe | |
| 4,793,748 | A * | 12/1988 | Santi | ................ B23B 29/03446 407/45 |
| 5,120,167 | A | 6/1992 | Simpson | |
| 5,222,846 | A * | 6/1993 | Romi | ..................... B23B 29/02 408/161 |
| 6,394,710 | B1 | 5/2002 | Kurz | |
| 6,402,440 | B2 * | 6/2002 | Soma | ................ B23B 29/03421 408/154 |
| 6,536,997 | B1 | 3/2003 | Kress | |
| 7,699,567 | B2 * | 4/2010 | Nedzlek | ................. B23D 43/04 408/158 |
| 8,678,721 | B2 * | 3/2014 | Shozda | ................. B23B 29/034 408/152 |
| 2003/0002938 | A1 * | 1/2003 | Maar | ................ B23B 29/03453 408/168 |
| 2004/0028489 | A1 | 2/2004 | Brock et al. | |
| 2004/0136794 | A1 | 7/2004 | Giorda | |
| 2010/0054874 | A1 * | 3/2010 | Azzopardi | ............. B32B 29/02 407/45 |
| 2011/0058910 | A1 * | 3/2011 | Nedzlek | ............ B23B 29/03446 408/1 R |
| 2011/0303057 | A1 | 12/2011 | Craig et al. | |
| 2013/0064618 | A1 * | 3/2013 | Frota De Souza Filho | ................. B23B 29/03 408/143 |
| 2015/0306672 | A1 * | 10/2015 | Bassett | ............... B23B 27/1681 407/88 |
| 2016/0096226 | A1 * | 4/2016 | da Silva | ............ B23B 29/03417 408/168 |
| 2017/0014916 | A1 * | 1/2017 | Gehlsen | .................. B23B 41/12 |
| 2018/0029135 | A1 * | 2/2018 | Marcelo Euripedes | ..................... B23B 29/0341 |

FOREIGN PATENT DOCUMENTS

| | | | |
|---|---|---|---|
| DE | 40 22 579 A1 | 1/1991 | |
| DE | 4402503 A1 * | 8/1995 | ....... B23B 29/03417 |
| DE | 196 49 143 | 6/1997 | |
| DE | 100 52 376 A1 | 5/2002 | |
| DE | 10 2004 052 211 A1 | 4/2006 | |
| DE | 102004052211 A1 * | 4/2006 | ............. B23B 41/12 |
| DE | 10 2005 028 366 A1 | 12/2006 | |
| DE | 102005028366 A1 * | 12/2006 | ............. B23B 41/12 |
| DE | 10 2014 019 175 A1 | 6/2016 | |
| DE | 10 2016 217 243 A1 | 3/2018 | |
| EP | 0016744 A1 * | 10/1980 | ........... B23B 29/034 |
| EP | 0 382 474 A2 | 8/1990 | |
| EP | 1 084 783 A1 | 3/2001 | |
| EP | 1 402 979 B1 | 6/2005 | |
| FR | 1 034 115 | 7/1953 | |
| JP | H0359109 U | 6/1991 | |
| JP | 2005-131742 A | 5/2005 | |
| JP | 2016-074056 | 5/2016 | |
| WO | WO-9415742 A1 * | 7/1994 | ....... B23B 29/03421 |
| WO | 98/48964 A1 | 11/1998 | |
| WO | 2004/012887 A2 | 2/2004 | |
| WO | 2009/005804 A1 | 1/2009 | |
| WO | 2010/021284 A1 | 2/2010 | |
| WO | WO-2013002506 A2 * | 1/2013 | ....... B23B 29/03417 |

OTHER PUBLICATIONS

Description DE102005028366A1 (translation) obtained at https://worldwide.espacenet.com/ (last visited Feb. 24, 2021).*
International Search Report and Written Opinion of the International Searching Authority (and English translation) from a corresponding International patent application (PCT/EP2018/070397) dated Nov. 19, 2018, 17 pages.
DPMAregister from a corresponding German patent application (DE 10/2017 213 046.6 printed on Feb. 12, 2020, 2 pages.
International Preliminary Report on Patentability from a corresponding International patent application (PCT/EP2018/070397) dated Jan. 28, 2020, 7 pages.

* cited by examiner

CUTTING TOOL AND METHOD FOR MACHINING A BEARING TUNNEL

The invention relates to a cutting tool and to a method for machining a bearing tunnel according to the preamble of the independent claims.

A generic cutting tool is known, for example, from DE 100 52 376 A1. The cutting tool shown in the publication has a main part (ground holder), which can be driven about a rotational axis, and a machine tool-side interface, which extends the main part and comprises a HSK (hollow taper shank) shank. In one embodiment of the cutting tool, a cutting insert holder (tool holder), which is equipped with a cutting plate (tool), is mounted on the main part in a receiving pocket, which is open on the outer circumferential side, while in another embodiment, two cutting insert holders, which are each equipped with a cutting plate, are each mounted axially offset on the main part in a receiving pocket, which is open on the outer circumferential side. To compensate for a cutting insert wear, each cutting insert holder can be radially set. A setting device provided for this purpose is formed of a setting rod (setting mandrel), which is arranged in the main part such that it can be longitudinally moved, and of a setting element (pressure element), which is supported with a first end on a control surface on the setting rod and with its second end on the cutting insert holder. In the case of an axial movement of the setting rod, which is prompted by means of a setting screw that can be actuated on the front side, the cutting insert holder is or the cutting insert holders are displaced radially to the outside via a wedge surface drive formed by the assigned control surface of the setting rod and the respective setting element.

Further cutting tools, which are based on a similar operating principle, comprising one or several cutting insert holders are known, for example, from DE 40 22 579 A1, WO 2004/012887 A2, EP 1 402 979 B1, WO 98/48964 A1, WO 2009/005804 A1, DE 24 05 694 A1 or WO 2010/021284 A1.

In the case of the above-specified cutting tools, the cutting insert holders for fine setting of the cutting inserts or for compensation of a cutting insert wear can be set relative to the main part either by means of an elastic deformation (see, e.g., DE 100 52 376 A1, EP 1 402 979 B1, WO 2009/005804 A1, and DE 24 05 694 A) or by means of a pivoting (see DE 40 22 579 A1, WO 2004/012887 A2, WO 98/48964 A1, and WO 2010/021284 A1). For this purpose, the cutting insert holders are radially controlled via a setting rod, which is arranged in the main part of the cutting tool such that it can be axially moved, and a setting element, which is arranged in the main part between a wedge surface on the setting rod and the cutting insert holder such that it can be radially moved.

A multi-point cutting tool (drill rod) is proposed in DE 10 2004 052 211 A1 and in DE 10 2005 028 366 A1, which provides for an individual resetting of each of the several cutting inserts via a setting rod (pull rod). For this purpose, it is proposed concretely to individually connect a setting device of each of a plurality of cutting insert holders (clamping holders) to the setting rod via a coupling device. Due to the coupling devices arranged between the setting devices of the cutting insert holders and the central setting rod, an individual cutting insert resetting is made possible in order to compensate for a cutting insert wear.

In the case of the above-discussed known solutions, however, further setting options, which would in particular allow for an individual cutting insert setting, which is independent of the axial position of the setting rod, are not provided.

The person of skill in the art does know various adjusting devices, which provide for an individual displacement of a cutting insert holder in relation to a main part of a cutting tool, for compensating for a cutting insert wear. For instance, an adjusting device is further known for example from DE 196 49 143 A1, which is formed of a differential screw and a threaded sleeve and which is arranged in the main part (shank) of a cutting tool (drill rod). The proposed adjusting device, however, has a large space requirement and cannot be combined with a setting rod, as it is known from the above-discussed publications.

A cutting tool comprising a cutting insert holder (cartridge), which is arranged in a receiving pocket (recess), which is open on the outer circumferential side, and which is divided by a slot into a bridge (bight portion) and two legs, one leg of which is tightly screw-connected to a main part (boring bar) and the other leg supports a cutting plate and can be radially set relative to the one leg by means of an elastic deformation, is known further from U.S. Pat. No. 4,428,704. The adjusting device arranged inside the cutting insert holder for this purpose, which has a differential screw, acts between the legs, which can be deformed relative to one another, of the cutting insert holder part. The tight screw-connection of the cutting insert holder, however, prevents a radial setting of the entire cutting insert holder relative to the main part, so that the adjusting device proposed in U.S. Pat. No. 4,428,704 can also not be combined with a setting rod, as it is known from the above-discussed publications.

Based on the above-discussed prior art, the invention is thus based on the object of providing a cutting tool comprising a main part, which can be rotationally driven about a rotational axis, and at least one cutting insert holder, which can be radially set on the main part, wherein the at least one cutting insert holder can be radially set such that a precise setting of the cutting insert or of the cutting insert element of the cutting insert holder, respectively, is possible via a setting rod, which is arranged in the main part of the cutting tool such that it can be moved, on the other hand, and by means of an adjustment, which is independent of a movement of the setting rod, on the other hand. It is further the object of the invention to provide a cutting tool comprising at least one radially settable cutting insert holder, in the case of which the design of setting and adjusting device assigned to the cutting insert holder is of such a nature that a large number of cutting insert holders can be provided on the cutting tool in the longitudinal direction (direction of the rotational axis) of the cutting tool, so that in particular all or at least as many machining steps as possible of a bearing tunnel can be performed by means of a cutting tool of this type. It is further the object of the invention to provide a method for the efficient machining of a bearing tunnel or of the bearing point(s) thereof, respectively, by means of the cutting tool according to the invention.

The object is solved by means of a cutting tool and a method for machining a bearing tunnel comprising the features of the independent claims. Advantageous or preferred further developments are in each case the subject matter of dependent claims.

A cutting tool according to the invention is preferably used for bore finishing or bore fine-machining, in particular of a so-called bearing tunnel. Tools of this type are used, for example, in the automobile industry in order to machine the bores of several bearing webs arranged in series of a bearing tunnel for mounting a shaft, for example a crankshaft or camshaft, to a final diameter dimension. The cutting tool is preferably formed with multiple points, so as to be able to synchronously machine several bearing webs of a bearing tunnel, wherein several cutting insert holders are arranged on the main part of the cutting tool at distances corresponding to the axial distances of the bearing webs, preferably in a row.

The cutting tool according to the invention has a main part, which can be driven about a rotational axis, at least one cutting insert holder arranged on the main part such that it can be radially set, and a setting device for setting the position of the cutting insert holder in relation to the main part. The at least one cutting insert holder is arranged in a guide recess in the main part such that it can be moved transversely (perpendicular), preferably radially, to the rotational axis of the main part. The setting device has a setting rod, which is arranged in the main part such that it can be moved axially (i.e. in the longitudinal direction of the main part), and supports the at least one cutting insert holder. The cutting tool according to the invention can have a plurality of cutting insert holders, which are each arranged in a guide recess assigned thereto in the main part such that they can be moved perpendicular, preferably radially, to the rotational axis of the main part, and are supported on the one setting rod, wherein the cutting insert holders can preferably be moved synchronously via the setting rod.

A precise setting and displacement of the cutting element with respect to the main part and a workpiece, which is to be machined, can be attained due to the in particular radial movability of the cutting insert holder and thus of the cutting insert arranged thereon (of the cutting element arranged thereon), in particular a more precise setting than in the case of a displacement of the cutting insert holder by the pivoting or elastic deformation thereof, as it is known from the prior art.

At least one cutting element, which protrudes radially to the outside from the cutting insert holder, can be provided on the latter. The cutting element is in particular a cutting plate comprising a cutting insert, preferably a reversible cutting plate. The cutting element can be received in the seat provided for it on the cutting insert holder such that the position can be set, e.g. by means of screw-connection, clamping, etc., or such that it is positionally fixed, e.g. by means of adhering or soldering. It goes without saying that a cutting insert holder can comprise several cutting inserts (cutting elements).

The or the respective cutting insert holder, respectively, is preferably received in a positive manner in the guide recess of the main part assigned to it. The respective cutting insert holder is furthermore preferably received in the guide recess so as to be secured against rotation and can be formed as drill bit, which is inserted into the guide recess. The guide recess thereby extends perpendicular to the rotational axis of the main part of the cutting tool according to the invention and in the direction of movement of the cutting insert holder. The guide recess is preferably formed as through recess, in particular as through bore, which passes through the main part. A design of the guide recess as ground recess comprising a ground/bottom in terms of a blind hole is also possible.

The or each cutting insert holder, respectively, preferably has an axial aperture, i.e. an aperture extending along the rotational axis of the cutting tool according to the invention, in which the setting rod is received, which also extends in the longitudinal direction. Each cutting insert holder is supported essentially radially on the setting rod, which is arranged in the main part of the cutting tool such that it can be moved axially, in such a way that the cutting insert holder can be radially controlled to the inside and to the outside, i.e. moved radially to the inside and outside for displacing the cutting insert holder and thus the cutting element provided on the cutting insert holder relative to the main part. It can in particular be provided that the cutting insert holder with its cutting insert element can be radially displaced by means of the setting rod in the radial direction between a position that is controlled to the inside/moved in, in which the cutting element held on the cutting insert holder lies at a minimal diameter relative to a rotational or longitudinal central axis of the main part (in the radial direction for example at a defined (small) distance outside, at the height or within the outer circumference of the main part), and a positions that is controlled to the outside, in which the cutting element held on the cutting insert holder lies at a maximum radius, i.e. at a predetermined nominal diameter dimension relative to the rotational or longitudinal central axis of the main part (i.e. at a (large) radial distance above the outer circumference of the main part).

For this purpose, the setting rod preferably has portions of a different diameter. One or several portions defining a maximum diameter of the setting rod can thus exist present, for example, by means of one or several cylinder portions. If the cutting insert holder is supported on a portion of this type, it reaches its outer radius, which can be maximally attained by means of the setting rod. Following a cylinder portion, the setting rod preferably has a diameter narrowing, preferably in the form of a conical portion following the cylinder portion in the longitudinal direction. With the axial movement of the setting rod so that the cutting insert holder is supported on a conical portion, it can now be attained that the cutting insert holder supported on the setting rod is radially controlled to the inside, i.e. is moved radially to the inside, for example to move the cutting tool into a bore to be machined, without the cutting element supported by the cutting insert holder coming into contact with the bore wall to be machined. The cutting insert holder can subsequently be radially controlled to the outside (i.e. moved radially to the outside) again, in that the setting rod is moved in the longitudinal direction, so that the cutting insert holder runs onto an above-mentioned cylinder portion, whereby the cutting element supported on the cutting insert holder can be brought to the previously adjusted nominal diameter again, and the bore can be machined. The setting rod is preferably connected to a piston element, which is arranged in a pressure chamber provided in the main part, by means of which said setting rod can be moved in the direction of the rotational axis of the main part and which can be supported elastically, preferably in a spring-loaded manner, in relation to the main part. A corresponding pressure chamber and a corresponding piston element are described in the German patent application No. 10 2016 217 243.3.

The cutting insert holder is preferably supported elastically, preferably in a spring-loaded manner, in relation to the main part, so that it can be moved perpendicular to the rotational axis of the main part and thus perpendicular to the setting rod. For this purpose, the cutting insert holder according to the preferred embodiment is connected to a traverse, which is supported against the main part via one or several compression springs, wherein the compression springs extend in the direction of movement of the cutting insert holder. The traverse, in turn, preferably extends perpendicular to the direction of movement of the cutting insert holder, and perpendicular to the rotational axis of the main part.

The cutting tool according to the invention preferably further has an adjusting device, which is integrated in the cutting insert holder, for adjusting/setting the position of the cutting insert holder in relation to the setting rod. In the case of several cutting insert holders, each or at least some cutting insert holders can be assigned its own adjusting device of this type. The position of the cutting insert holder can be preset relative to the setting rod and thus to the main part by means of the adjusting device in response to the production of the cutting tool according to the invention. In the alternative, a resetting of the position of the cutting insert holder in relation to the setting rod and thus to the main part is possible during the use of the cutting tool according to the invention, without having to separate the cutting tool from the machine tool spindle. Dimensional fluctuations, which might stem from a change or removal of the cutting tool, can be avoided thereby. A resetting of this type may be required in particular in the case of wear of the cutting insert of the cutting element of the cutting insert holder.

The adjusting device, which is assigned to the cutting insert holder and which is integrated therein, preferably has a setting element supported on the setting rod and a threaded drive, which displaced the setting element relative to the cutting insert holder. The threaded drive moves the setting element, preferably relative to the setting rod, viewed from the cross section thereof. According to a preferred design, the setting element is formed of a threaded sleeve, which has a control slope, on which the cutting insert holder is supported. The threaded sleeve can be moved in its axial direction, i.e. transversely (perpendicular) to the rotational axis of the main part and transversely (perpendicular) to the direction of movement of the cutting insert holder. The threaded drive has a drive spindle, which is mounted on the cutting insert holder and is screw-connected to the threaded sleeve. The threaded drive preferably further has a threaded bushing (also referred to as bearing bushing), which is secured in the cutting insert holder spaced apart from the threaded sleeve. The threaded bushing is arranged in a stationary manner in the cutting insert holder. In particular for production-related reasons, the threaded bushing instead of a threaded bore is provided in the cutting insert holder.

The drive spindle is preferably formed as differential threaded spindle, which is screw-connected with a first threaded portion to the threaded sleeve and with a second threaded portion to the threaded bushing. Threaded sleeve and threaded bushing are screwed onto the differential threaded spindle. The first threaded portion and the second threaded portion can have different thread pitches (leads), but identical thread directions (lead directions). In response to an actuation of the differential threaded spindle, the threaded sleeve moves in the direction of the spindle axis, i.e. perpendicular to the rotational axis of the main part and perpendicular to the direction of movement of the cutting insert holder by a distance, which corresponds to the difference in pitch of the two threaded portions of the differential threaded spindle. A compression spring can be provided between the threaded sleeve and the threaded bushing, so as to reduce a thread play between the external thread of the first threaded portion of the differential threaded spindle and the internal thread of the threaded sleeve on the one hand, and a thread play between the external thread of the second threaded portion of the differential threaded spindle and the internal thread of the threaded bushing on the other hand.

An actuating element, which is held on the cutting insert holder such that it can be rotationally moved and which engages with the drive spindle or the differential threaded spindle, respectively, in a rotationally fixed manner and in particular in an axially movable manner, i.e. connected in a rotationally fixed manner and such that it can be moved in particular in the direction of movement of the threaded sleeve, and which serves for the rotational actuation of the drive spindle or of the differential threaded spindle, respectively, is preferably assigned to the or each adjusting device, respectively, of the cutting tool according to the invention. The actuating element preferably comprises a so-called scale ring, which has, for example, a scaling of 10 marks/graduation marks. The actuating element or the scale ring thereof, respectively, is preferably fastened to the main part of the cutting tool according to the invention by means of a spring ring and simultaneously represents the longitudinal coupling of the drive spindle or of the differential threaded spindle, respectively.

Due to the fact that the cutting insert holder is supported on the setting rod via the control slope of the setting element of the adjusting device, the cutting insert holder—in addition to an axial movement of the setting rod—can advantageously also be radially moved via the adjusting device, in that the setting element is moved perpendicular to the direction of movement of the cutting insert holder and perpendicular to the rotational axis of the main part by means of the threaded drive.

The cutting tool according to the invention thus offers at least two options, which are independent of one another, for a radial cutting insert displacement. In particular in the case of a bearing tunnel, all bearing webs have to be made with a very precise diameter and with a high alignment accuracy. Each cutting tool designed according to the invention ensures the individual fine adjustment of the cutting inserts in the μm-range, which is required for this purpose. Due to the radial movability of the cutting insert holder or of the cutting insert holders, respectively, and thus of the cutting insert arranged thereon or of the cutting element arranged thereon, respectively, a precise setting and displacement of the cutting element in relation to the main part and a workpiece to be machined, can thus be attained, in particular a more precise setting than in the case of a displacement of the cutting insert holder by pivoting or elastic deformation, as it is known from the prior art.

The control option resulting from an axial movement of the setting rod can in particular be used in the case of several cutting insert holders, which are supported on the setting rod, to radially control them to the inside or to the outside or to move them, respectively, in a synchronous manner relative to the main part of the cutting tool, in particular so as to move the cutting tool, in the state of the cutting insert holders, in which they are controlled to the inside, in a straight line, for example, centrically, into a bearing tunnel to be machined and to move them inside the latter, without the cutting elements coming into contact with the bearing bore to be machined, and so as to subsequently radially control the cutting insert holders to the outside or to move them radially to the outside, respectively, in a synchronous manner by means of axial movement of the setting rod, so as to machine the bearing webs of the bearing tunnel to the desired nominal diameter.

Due to the fact that the adjusting device of the cutting tool according to the invention extends in the transverse direction to the rotational axis of the main part as well as in the transverse direction to the direction of movement of the cutting insert holder, an installation space-saving arrangement of the cutting insert holders in the axial direction, i.e. in the longitudinal direction, of the cutting tool is possible, so that a large number of cutting insert holders and thus a large number of cutting inserts/cutting elements can be provided in a small space (viewed in the axial direction or longitudinal direction, respectively) on the cutting tool, whereby a structural weakening of the cutting insert holders can be avoided in an advantageous manner. Due to the fact that different cutting inserts/cutting elements can typically be used for different machining steps (e.g. roughing, semi-finishing, finishing, providing with a bezel, etc.), cutting inserts for a large number of machining steps can be accommodated on a (tool) portion of relatively short axial expansion in the case of the cutting tool according to the invention, so that the cutting tool according to the invention has to be moved back and forth only over short distances in the longitudinal direction, for example in response to the machining of bearing points of a bearing tunnel in response to a change from one machine step to the next, and thus in response to the change from one cutting insert to another cutting insert, and only a single cutting tool according to the invention is advantageously required for the machining of a bearing tunnel. This means that no change has to be made between different cutting tools comprising cutting insert holders/cutting elements, which are formed for different machining steps.

In the case of the cutting tool according to the invention, cutting insert holders assigned to different machining steps are preferably combined in a tool portion, wherein the cutting tool preferably comprises several tool portions, which are aligned with one another in the longitudinal direction and which are arranged adjacent to one another. A tool portion of the cutting tool according to the invention thus preferably comprises a first cutting insert holder for a rough machining of a bearing web of a bearing tunnel, a second cutting insert holder for attaching a bezel to a bearing web, a third cutting insert holder for a semi-finishing of a bearing web, and a fourth cutting insert holder for a finishing of a bearing web. Cutting insert holders of one tool portion can thereby be used for the machining of two bearing webs, which are arranged next to one another in the longitudinal direction of the bearing tunnel. This means that one bearing web can be machined by two adjacent tool portions.

An adjusting device, as it is described above and/or in connection with the following figure description, is preferably in each case assigned to the fourth cutting insert holder, which is provided for the finishing, and preferably also to the third cutting insert holder, which is provided for the semi-finishing, which adjusting device is in each case integrated in said insert holders, because a particularly precise setting for a particularly high machining accuracy is required in the case of these cutting insert holders, which perform final machining steps. To save space, an adjusting device of this type can be forgone, in contrast, in the case of the first and second cutting insert holders, which are used for comparatively rougher operating steps, such as roughing and attaching a bezel.

To ensure an efficient machining of the one or several bearing webs, the first cutting insert holder, the second cutting insert holder, the fourth cutting insert holder, and the third cutting insert holder preferably follow one another, viewed in the longitudinal direction of the cutting tool.

By means of a cutting tool of this type according to the invention, a bearing tunnel comprising several bearing webs, which are arranged spaced apart from one another in the longitudinal direction and which are preferably arranged axially in series, can be finished to a predetermined nominal diameter as follows in the following steps:

moving the cutting tool into the bearing tunnel in a centered and straight manner, wherein the cutting insert holders are in the moved-in position, until the first cutting insert holders of the tool portions, which are provided for the rough machining, are positioned for machining the bearing webs;

displacing the cutting insert holders into their moved-out position by means of the setting device, in particular the setting rod thereof, rough machining of the bearing webs by means of the first cutting insert holders by rotational movement of the main part, wherein the cutting tool is moved further in a straight line, further moving the cutting tool in a straight line until the second cutting insert holders of the tool portions, which are provided for attaching a bezel, are positioned for machining the bearing webs, attaching a one-sided bezel to the bearing webs by means of the second cutting insert holders by means of rotational movement of the main part, displacing the cutting insert holders into their moved-in position by means of the setting device, moving the cutting tool in a straight line, in particular in the direction opposite to the previous direction of movement, until the third cutting insert holders, which are provided for the semi-finishing, of the tool portions adjacent to the tool portions, which were previously used for machining a bearing point, are positioned for machining the bearing webs, displacing the cutting insert holders into their moved-out position by means of the setting device, in particular the setting rod thereof, semi-finishing the bearing webs by means of the third cutting insert holders of the adjacent tool portions by means of rotational movement of the main part, whereby the cutting tool is moved further in a straight line, further moving the cutting tool in a straight line until the fourth cutting insert holders, which are provided for the finishing, of the adjacent tool portions are positioned for machining the bearing webs, finishing the bearing webs by means of the fourth cutting insert holders of the adjacent tool portions by means of rotational movement of the main part, whereby the cutting tool is moved further in a straight line, further moving the cutting tool in a straight line until the second cutting insert holders of the adjacent tool portions are positioned for machining the bearing webs, attaching a one-sided bezel to the bearing webs on the side, on which no bezel has been attached yet, by means of the second cutting insert holders of the adjacent tool portions by means of rotational movement of the main part, displacing the cutting insert holders into their moved-in position by means of the setting device, in particular the setting rod thereof, and moving the cutting tool out of the bearing tunnel in a straight line.

The radial displacement of the cutting insert holders in their moved-in and moved-out position thereby preferably takes place by means of axial movement of the setting rod, which is arranged in the main part of the cutting tool, of the setting device, which can be driven fluidically, hydraulically, pneumatically, electromotively or electromagnetically for this purpose, whereby the radial displacement is in particular a radial movement.

Following the above machining of the bearing webs, the bores of the machined bearing webs can be checked for dimensional accuracy of the nominal diameter. In the event that it is determined for one or several of the bearing webs that the bore diameter deviates from the predetermined nominal diameter, in particular the fourth cutting insert holders, which are responsible for the finishing, and preferably also the third cutting insert holders, which are responsible for the semi-finishing and which had machined the bearing web or the bearing webs, respectively, with a nominal diameter, which had not been reached, can be readjusted by means of the adjusting devices assigned thereto in such a way that the dimensional accuracy of the nominal diameter is at hand in response to a subsequent re-machining.

All of the required machining steps of a bearing tunnel can advantageously be performed by means of the cutting tool according to the invention, without requiring a switch from the cutting tool to a different cutting tool with other cutting inserts or cutting insert holders, respectively. In the case of the cutting tool according to the invention, all required cutting insert holders or cutting inserts, respectively, are integrated in a cutting tool A preferred embodiment of a cutting tool according to the invention and of a method according to the invention will be described below with the help of the enclosed drawings, in which:

Figure 1:
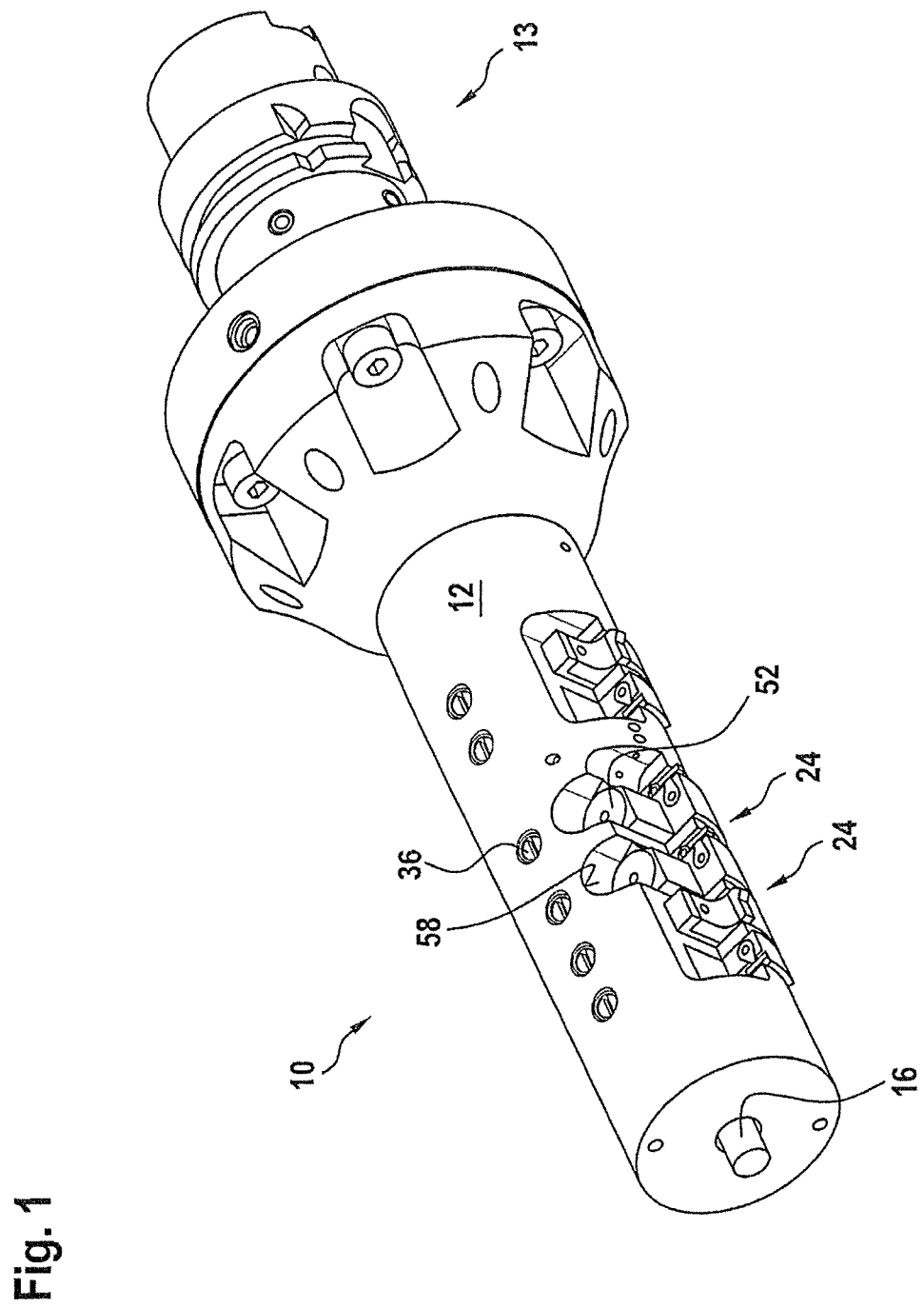
FIG. 1 shows a perspective view of a cutting tool according to the invention.

FIG. 1 shows a multi-point cutting tool 10 according to the invention, which can be used for a bearing tunnel machining. It goes without saying that the cutting tool 10 can also have only one cutting insert and thus only one cutting insert holder. The multi-point cutting tool 10 has a main part 12 (also referred to as tool shank), which can be rotationally driven about a rotational or longitudinal central axis, respectively, which is not identified in more detail and which can be formed as a drill rod and which preferably has a machine tool spindle-side interface 13, which axially adjoins the main part 12 on the rear (in FIG. 1 right) end and which, in the shown embodiment, has a so-called HSK (hollow taper shank) shank. In the alternative, a so-called SK (steep taper) shank or the like can be provided, for example. On the front (in FIG. 1 left) end, which is located at a distance from the interface 13, the main part 12 can have a cylindrical bearing portion, via which the cutting tool 10 experiences a support during the machining.

Figure 2:
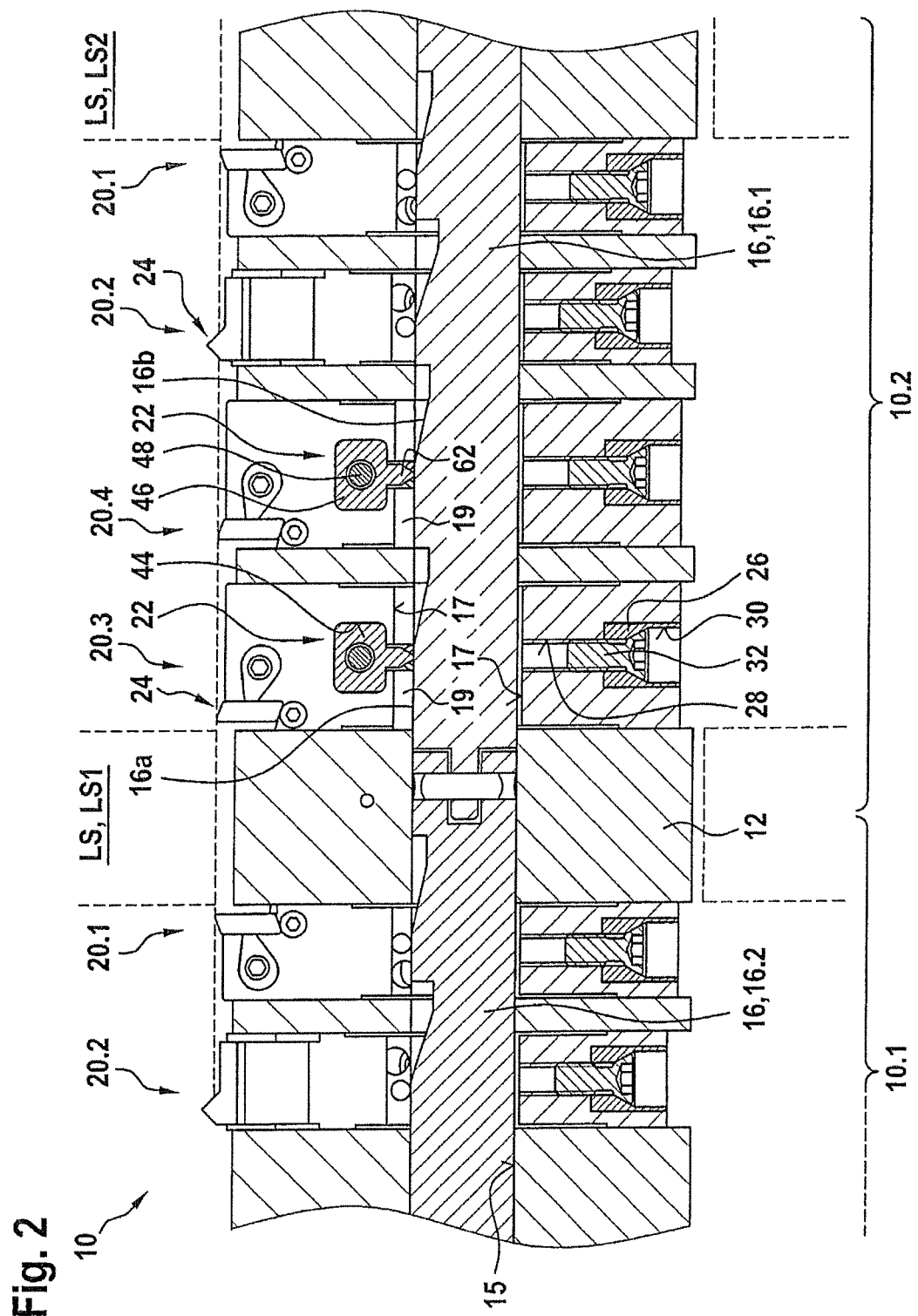
FIG. 2 shows a longitudinal section of a longitudinal portion of the cutting tool shown in FIG. 1.
Figure 3:
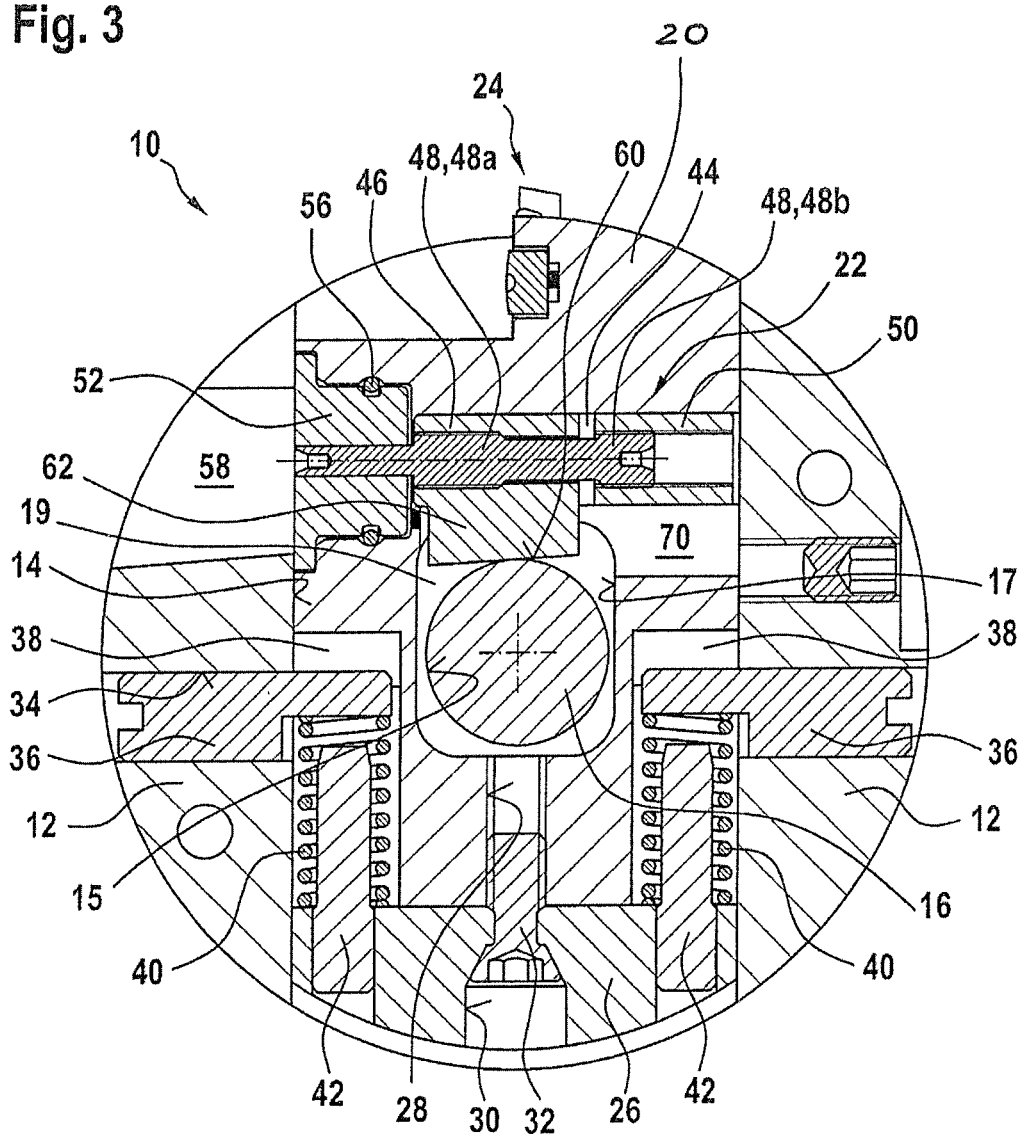
FIG. 3 shows a cross section of the cutting tool shown in FIGS. 1 and 2.

It can further be seen in FIGS. 1 to 3 that the cutting tool 10 according to the invention has a setting rod 16, which is arranged in a centrically arranged axial through bore or through recess 15, respectively, in the main part 12 such that it can be longitudinally moved and which forms a setting device for setting the position of a cutting insert holder 20, 20.1-20.4 in relation to the main part 12. In the shown embodiment, the setting rod 16 consists of several parts, in particular a number of parts, which are connected to one another in a tension-/pressure-resistant manner in the axial direction, corresponding to the number of the below-described tool portions 10.1, 10.2, of which the adjacent parts 16.1 and (partially) 16.2 are illustrated in an exemplary manner in FIG. 2.

Figure 5:
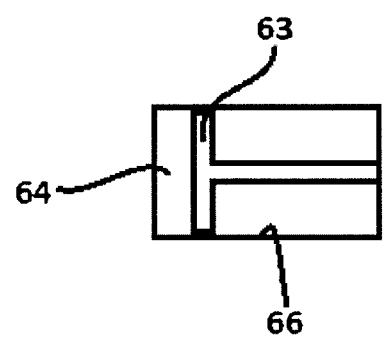
FIG. 5 is a schematic block diagram showing a pressure chamber and a piston element.

On its interface-side end, the setting rod 16 is preferably connected in a tension-/pressure-resistant manner to a piston 63 (also referred to as piston element)(see FIG. 5), which is received in a sealed manner in a cylindrical opening 66 in the main part 12 and which, in response to pressurization, can be moved axially relative to the interface 13 against the spring force of a non-illustrated compression spring, which is arranged between the piston 63 and the bottom of the cylindrical opening 66. A non-illustrated duct system, which is formed in the main part 12 and which is operatively connected to the pressure chamber 64 of the cylindrical opening 66, can further be used to supply the cutting inserts of the cutting tool 10 with cooling lubricant. If the cooling lubricant feed pressure is increased beyond a predetermined level, the piston 63 is displaced in such a way that the setting rod 16 is moved to the left in FIG. 1. If the cooling lubricant feed pressure is subsequently lowered again to below the predetermined level, the piston 63 and the setting rod 16 are pushed or moved back, respectively, to the right again in FIG. 1 by means of the spring force of the compression spring 65-arranged between the piston 63 and the main part 12. The principle for axially moving the setting rod 16 is generally known from German patent application No. 10 2016 217 243.3, so that a more in-depth description is forgone.

It can further be seen in FIG. 2 that each of the parts 16.1 and 16.2 of the setting rod 16 has cylinder portions 16a and conical portions 16b alternating in the longitudinal direction. The axially consecutive cylinder and conical portions 16a, 16b of each part 16.1 and 16.2 form control surfaces of the setting rod 16, which are assigned to the respective part 16.1 and 16.2 and which each consist of a cylinder surface portion and of a conical surface portion and on which the below-described cutting insert holders 20, 20.1-20.4 are radially supported. The cylinder portions 16a can be designed with axially different lengths. The same applies for the conical portions 16b. Cylinder portions 16a and conical portions 16b, which are assigned to cutting insert holders 20, 20.3, 20.4 comprising the adjusting device 22, which will be described later (see FIGS. 2 and 3), are in particular longer than cylinder portions 16a and conical portions 16b, which are assigned to cutting insert holders 20, 20.1, 20.2 without additional adjusting device 22. To save space in the longitudinal direction of the cutting tool 10, an adjusting device 22 is in each case preferably only assigned to those cutting insert holders 20, 20.3, 20.4, the cutting inserts of which have to be set particularly accurately. These are in particular the cutting inserts of the cutting insert holders 20.3, 20.4, which are used for the final machining steps, in particular the machining steps semi-finishing and finishing, whereby semi-finishing serves for the rough machining of the bearing webs LS, and finishing serves for the final machining of the bearing webs LS.

Figure 4:
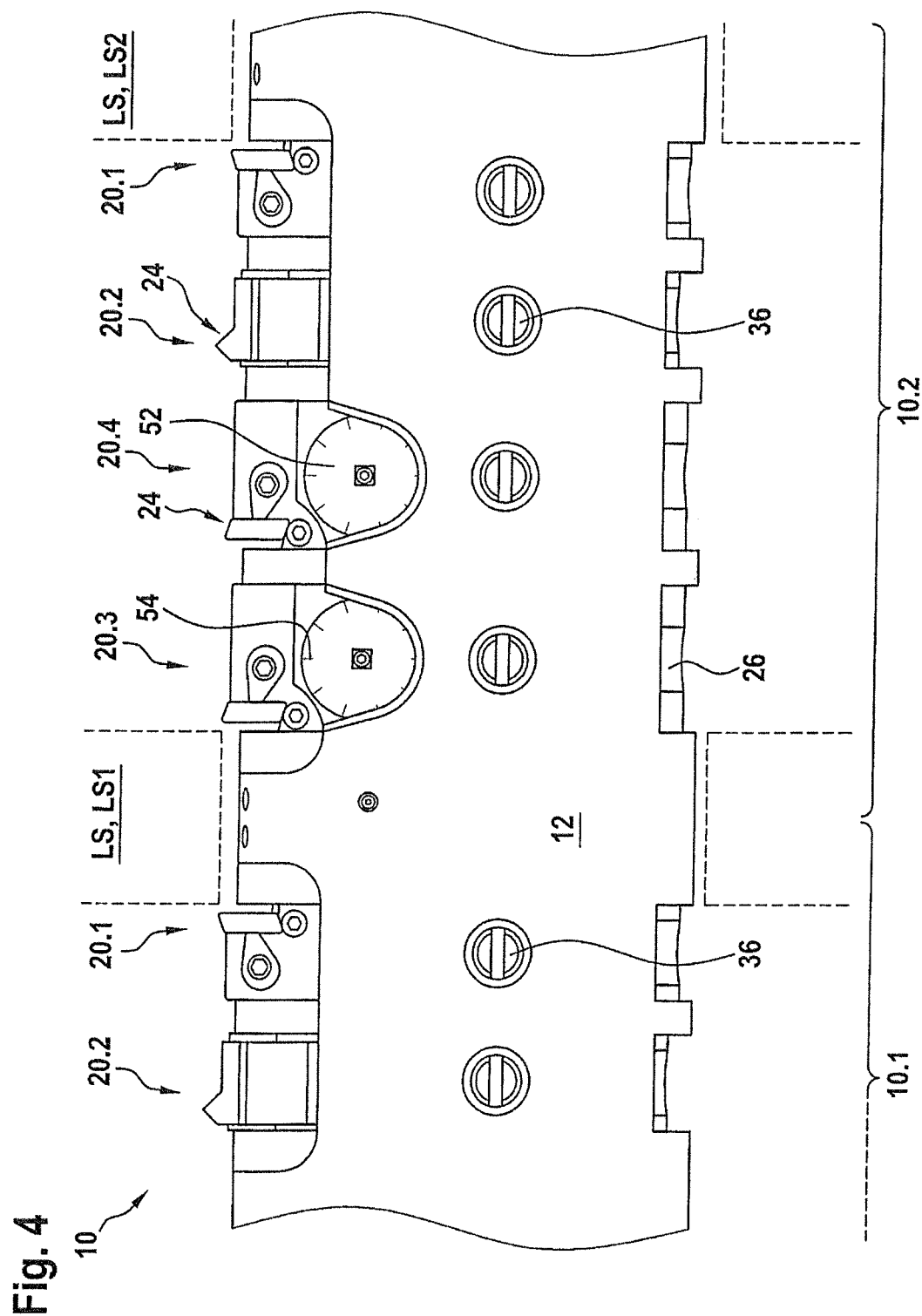
FIG. 4 shows a side view of the cutting tool shown in FIGS. 1-3.

The cutting tool 10 according to the invention preferably comprises several tool portions 10.1, 10.2, which preferably in each case comprise all of the cutting insert holders 20.1-20.4, which are required for the machining of the bearing webs LS, comprising the respectively required cutting inserts (see FIGS. 2 and 4). The tool portions 10.1, 10.2 thus each comprise a cutting insert holder 20.1 for a rough machining, a cutting insert holder 20.2 for attaching a bezel, a cutting insert holder 20.3 for a semi-finishing, and a cutting insert holder 20.4 for a finishing. The cutting insert holders 20.1-20.4 are arranged in the longitudinal direction of the respective tool portion 10.1, 10.2, preferably in a sequence, which provides for a quick and efficient machining of the bearing webs LS, LS1, LS2, wherein a bearing web LS, LS1, LS2 is preferably machined by the tool portion, which is arranged to the left of it in the longitudinal direction, as well as by the tool portion, which is arranged to the right of it. The bearing web LS1, for example, is thus machined by the (partially illustrated) tool portion 10.1 as well as by the tool portion 10.2. The bearing web LS2 is accordingly machined by the tool portion 10.2 as well as by a non-illustrated tool portion 10.3 adjoining the tool section 10.2 on the right. The expressions "left" and "right" thereby refer to the illustrations in FIGS. 2 and 4. In the transverse direction, all cutting insert holders 20.1-20.4 preferably point in the same direction, so that the cutting inserts thereof are arranged in series in the longitudinal direction.

To machine a bearing tunnel, the cutting tool 10 is initially positioned outside of the bearing tunnel in such a way that the rotational axis of the main part 12 is aligned with the central axis of the bearing tunnel. The cutting tool 10 preferably does not yet rotate thereby. The cutting insert holders 20.1-20.4 are in the moved-in position. For this purpose, the setting rod 16 is moved in the longitudinal direction in such a way that all cutting insert holders 20.1-20.4 are supported on conical portions 16b of the setting rod 16, so that all cutting insert holders 20.1-20.4 are in moved-in position, so that the bearing webs LS, LS1, LS2 of the bearing tunnel cannot be in contact with one another when moving into the bearing tunnel. The movement of the adjusting rod 16 in the longitudinal direction/axial direction in each case takes place via the increase or lowering, respectively, of the pressure in the above-described, non-illustrated pressure chamber, as a result of which the above-described piston displaces or moves, respectively, the adjusting rod 16 to the left or to the right, respectively. The diameter dimension of the cutting plates 20.1-20.4 in the moved-in state can be larger than, equal to or smaller than the outer diameter of the main part 12, as long as a contact with the bearing webs LS, LS1, LS2, which are to be machined, can be avoided. The displacement of the cutting insert holders 20.1-20.4 by means of the setting rod 16 between moved-in and moved-out position and vice versa in each case takes place synchronously for all cutting insert holders 20.1-20.4.

In the moved-in state of the cutting insert holders 20.1-20.4, the cutting tool 10 is moved into the bearing tunnel in a straight line along its rotational or longitudinal central axis in the feed direction, namely until the cutting insert holders 20.1, which are provided for the first machining step (roughing), are positioned for machining the bearing webs LS1, LS2 assigned thereto, in particular—viewed in the feed direction—downstream from the or to the left, respectively, of the respective bearing web LS1, LS2, which is to be machined (see FIGS. 2 and 4). The distances between the cutting insert holders 20.1-20.4 are thereby selected in such a way in the longitudinal direction that the first cutting insert holder 20.1 is located to the left of the bearing web LS2 (for the tool portion 10.2). In the longitudinal direction, the second, fourth, and third cutting insert holder 20.2, 20.4, 20.3 of the tool portion 10.2 are arranged in this sequence to the left of the first cutting insert holder 20.1 and to the right of the bearing web LS1, which follows the bearing web LS1 on the left in the longitudinal direction. The same applies for the cutting insert holders 20.1-20.4 of the tool portion 10.1.

Next, all cutting insert holders 20.1-20.4 are moved into their moved-out position, in that the control rod 16 is moved in the longitudinal direction in such a way that the cutting insert holders 20.1-20.4 are supported on the cylinder portion 16a.

The bearing webs LS1, LS2 are then rough machined by the cutting insert holders 20.1 or the cutting inserts thereof, respectively, in that the cutting tool 10 or the main part 12 thereof, respectively, is rotationally driven, while the cutting tool 10 is moved so far into the longitudinal direction by means of an axial reverse feed (in FIGS. 2 and 4 to the right), until the bearing webs LS1, LS2 have been machined completely by the cutting insert holders 20.1.

After the rough machining step has ended, the cutting tool 10 is moved so far backwards in the longitudinal direction (in FIGS. 2 and 4 to the right), until the second cutting insert holders 20.2, which are responsible for attaching a bezel, are positioned for machining the bearing webs LS1, LS2, i.e. are located to the left of the bearing webs LS1 and LS2 or on the left corner thereof, respectively, in FIGS. 2 and 4. By rotationally driving the cutting tool 10, a bezel is attached to the bearing webs LS1, LS2 on one side (in FIGS. 2 and 4 on the left). The cutting insert holder 20.2 of the tool portion 10.1 attaches the one-sided bezel to the bearing web LS1, while the cutting insert holder 20.2 of the tool portion 10.2, which is adjacent to the right, attaches the one-sided bevel to the adjacent bearing web LS2. The cutting insert holders 20.1-20.4 can optionally be moved in and moved out again, if desired, between the first machining step (roughing) and the second machining step (one-sided attaching of a bezel) by axially displacing the setting rod 16.

For the next machining step (semi-finishing), the cutting insert holders 20.1-20.4 are moved into their moved-in position again by axially moving the setting rod 16, until the cutting insert holders 20.1-20.4 are supported on conical portions 16b again, so as to be capable of being moved through below the bearing webs LS1, LS2, and the cutting tool 10 is moved in a straight line in the longitudinal direction in the feed direction (in FIGS. 2 and 4 to the left), until the third cutting insert holders 20.3 of the tool portions 10.2, 20.3 (tool portion 10.3 is not illustrated), which are adjacent to those tool portions 10.1, 10.2, which had previously machined bearing points LS1, LS2, viewed opposite to the direction of movement of the cutting tool 10, are positioned for machining the bearing webs LS1, LS2. In FIGS. 2 and 4, the adjacent tool portions 10.2, 10.3 are in each case located to the right of the bearing webs LS1, LS2, which are to be machined. This means that the bearing web LS1, for example, which had previously been machined (roughing and attaching a first, left bezel in FIGS. 2 and 4) by the tool portion 10.1 or the cutting insert holders 20.1 and 20.2 thereof, is now machined by the cutting insert holder 20.3 of the tool portion 10.2. The following operating steps of the finishing and of the attaching of a second bevel located opposite the first (left) bezel to the bearing webs LS1, LS2 also take place by means of the cutting insert holders 20.4 (finishing) or 20.2 (attaching the second bezel) of the adjacent tool portion 10.2.

For the semi-finishing, the cutting insert holders 20.1-20.4 are moved out by means of axial displacement of the setting rod 16, so that the cutting insert holders 20.1-20.4 are supported on cylinder portions 16a, and the semi-finishing takes place by feeding the cutting tool 10 in the longitudinal direction thereof with simultaneous rotational movement of the cutting tool 10.

The finishing of the bearing webs LS1, LS2 is carried out subsequently, in that the cutting tool 10 is further moved in a straight line in the longitudinal direction (to the left in FIGS. 2 and 4), until the fourth cutting insert holders 20.4, which are responsible for the finishing, of the adjacent tool portions 10.2, 10.3 (the latter is not illustrated) are positioned to the left of the respective bearing webs LS1, LS2, and is further moved, until the cutting insert holders 20.4 of the adjacent tool portions 10.2, 10.3 have completely machined the bearing webs LS1, LS2. The cutting insert holders 20.1-20.4 can optionally be moved in and moved out again between the machining steps semi-finishing and finishing by axially moving the adjusting rod 16, if necessary.

Following the finishing, the cutting tool 10 is further moved in a straight line in the longitudinal direction, until the second cutting insert holder 20.2 of the tool portion 10.2, 10.3, which is adjacent to the tool portion 10.1, 10.2, which has attached the first bezel, opposite to the feed direction of the cutting tool 10, is positioned for machining the bearing web LS1, LS2 assigned to it, i.e. is positioned to the right of it in FIGS. 2 and 4 or is located on the right corner thereof, respectively. With the rotational movement of the cutting tool 10, the second bezel is finally attached to the bearing webs LS1, LS2, which are located opposite the first bezel in the longitudinal direction of the bearing tunnel. After the finishing and prior to the attaching of this second bezel, the cutting insert holders 20.1-20.4 can optionally be moved in or moved out again, respectively, by axially moving the setting rod 16, if desired.

The cutting insert holders 20.2 of each tool portion 10.1, 10.2, which are responsible for attaching the bezels, are thus in each case used for machining two adjacent bearing webs LS1, LS2, namely viewed in the longitudinal direction of the bearing tunnel, for machining the bearing web LS1 to the left of the respective cutting insert holder 20.2, and for machining the bearing web LS2 to the right of the respective cutting insert holder 20.2 (see FIGS. 2 and 4) or for machining the bearing web LS1 in the feed direction, and for machining the bearing web LS2 in the reverse feed direction. The cutting insert of the cutting insert holder 20.2 thus has two cutting surfaces located opposite one another in the longitudinal direction of the cutting tool 10. The respective cutting surface of the cutting insert holders 20.1, 20.3, 20.4, which are used for the roughing, semi-finishing, and finishing, is oriented in the axial direction of movement of the cutting tool 10, which is provided for the respective machining, i.e. in the case of the cutting insert holder 20.1 (roughing) to the right in, and in the case of the cutting insert holders 20.3 (semi-finishing) and 20.4 (finishing) to the left FIGS. 2 and 4. The number of the tool portions 10.1, 10.2, which are provided on the cutting tool 10, is preferably one higher than the number of the bearing webs LS1, LS2 to be machined, so that the bearing webs LS, LS1, LS2, which are located at the two opposite ends of the bearing tunnel, can also be machined completely by means of the cutting tool 10.

After ending the machining by means of the cutting tool 10, the rotational drive thereof is stopped, and the cutting insert holders 20.1-20.4 are moved in by axially moving the setting rod 16, so that the cutting insert holders 20.1-20.4 are supported on the conical portions 16b of the setting rod 16. The cutting tool 10 is then moved out of the bearing tunnel in a straight line in the longitudinal direction.

The (respective) cutting insert holder 20, 20.1-20.4 is received in a guide recess 14 provided in the main part 12 (see FIG. 3), wherein the guide recess 14 extends perpendicular to the rotational axis of the main part 12 or of the cutting tool 10, respectively, and preferably passes through the main part 12, i.e. is formed as through recess. The cutting insert holder 20 is arranged in the guide recess 14 such that it can be moved transversely, in particular radially, to the rotational axis of the main part 16. The guide recess 14 can have a circular or elliptical, but also a rectangular, in particular square cross section, wherein the cutting insert holder 20 has a corresponding cross section for a preferably positive connection to the guide recess 14. In particular a rectangular, square or elliptical cross section guarantees an anti-rotation protection of the cutting insert holder 20 in the guide recess 14.

Each of the cutting insert holders 20 has an axial aperture 17, i.e. an aperture 17 in the longitudinal direction of the cutting tool 10, for receiving the adjusting rod 16, through which the adjusting rod 16 is guided. The diameter of the aperture 17 of the cutting insert holder 20 is such that the adjusting rod 16 is guided loosely, i.e. with play (clearance 19) through the aperture 17, in particular in the direction of movement of the cutting insert holder 20, so that the cutting insert holder 20 can still be moved in its direction of movement by means of the adjusting device 22, which will be described later, even if it is supported on a cylinder portion 16a of the setting rod 16, in particular when an additional adjusting device 22, which will be described below, is assigned to the respective cutting insert holder 20.

The (respective) cutting insert holder 20 is preferably supported elastically, in particular in a spring-loaded manner, in relation to the main part 12. On its end located opposite the cutting element 24, the cutting insert holder is thus connected to a traverse 26, which extends perpendicular to the direction of extension/direction of movement of the cutting insert holder 20 and preferably perpendicular to the rotational axis of the main part 12, and is mounted on the main part 12 in a spring-loaded manner. This means that the cutting insert holder 20 is supported in a spring-loaded manner on the main part 12 via the traverse 26. To fasten the traverse 26 to the cutting insert holder 20, a groove 28, in particular a threaded bore, which can also be designed as through bore to the aperture 17 and into which a screw 32 is screwed, which is guided through a continuous through hole 30, in particular a through bore, which can be accessed from outside the main part 12 and which is oriented towards the indentation 28, can be provided on the end of the cutting insert holder 20 located opposite the cutting element 24. On its side facing away from the cutting insert holder 20, the traverse 26 is preferably rounded, wherein the rounding radius preferably corresponds to the radius of the main part 12.

Notches 34, in which support elements 36, for example pins, are secured, which protrude into notches 38 located opposite the notches 34 in the cutting insert holder 20 and which are open on the outer wall thereof, are preferably provided in the wall of the main part 12 surrounding the guide recess 14. The support elements 36 extend perpendicular to the rotational axis of the main part 12 and perpendicular to the direction of movement of the cutting insert holder 20 and protrude into the notches 38 provided in the cutting insert holder 20 below the traverse 26. This means that the traverse 26 extends laterally beyond the notches 38. The cutting insert holder 20 is secured against a rotation via the support elements 36, which are provided in the notches 34 of the main part 12 as well as in the notches 38 of the cutting insert holder 20.

To mount the traverse 26 and thus the cutting insert holder on the main part 12 in a spring-loaded manner, compression springs 40 are provided in the notches 38 provided on opposite sides of the cutting insert holder 20, which are supported on the support elements 36 on the side of the traverse and which push against the traverse 26, which extends transversely to the cutting insert holder 20, in the direction of movement of the cutting insert holder 20, in particular on the ends/end regions of the traverse 26, which protrude laterally into the notches 38. A compression spring 40 is preferably assigned to each end/end region of the traverse 26. Pins 42 can be provided on the ends/end regions of the traverse 26, which protrude into the notches 38 in the longitudinal direction/direction of movement of the cutting insert holder 20, but only so far that they are spaced apart by a predetermined distance from the side, which faces them, of the support element 36 assigned thereto, in particular in that movement state of the cutting insert holder 20, when the outer side of the traverse 26 is flush with the outer wall the main part 12. The pins 42 can be surrounded by the compression springs 40. This predetermined distance determines, how far the respective cutting insert holder 20 and thus the cutting element 24 thereof can be moved radially to the outside in the direction of movement of the cutting insert holder 20. The notches 34 can be continuous in the radial direction, so that the support elements 36 can be accessed from outside, for example to set or to displace, respectively, the spring force/spring bias of the compression springs 40.

According to an alternative embodiment, the traverse 26 can also extend beyond the cutting insert holder 20 into the main part 12 in the direction of the rotational axis of the main part 12 and can be mounted in the latter in a spring-loaded manner via corresponding compression springs 40, which are supported in corresponding notches on the main part 12. In the longitudinal direction of the main part 12, however, this would lead to a longer expansion of cutting insert holder 20 with traverse 26.

An adjusting device 22, which is integrated in the cutting insert holder 20, can be assigned to the or a cutting insert holder 20, respectively (see FIGS. 2 and 3). Depending on the use of the cutting insert of the cutting insert holder 20, an adjusting device 22 does not need to mandatorily be assigned to the cutting insert holder 20. In particular as described above, an adjusting device 22 can be foregone in particular in the case of cutting inserts, which are used for rough machining (e.g. roughing) or for machining, in the case of which a highly precise execution (for example in the micrometer range) is not required (e.g. when attaching a bezel).

The position of the cutting insert holder 20 in relation to the adjusting rod 16 can be set by means of the adjusting device 22. The cutting insert holder 20 has a guide recess 44, preferably in the form of an aperture, in which the adjusting device 22 is preferably arranged in a positive manner, so that the adjusting device 22 extends transversely to the rotational axis of the main part 12 and transversely to the direction of movement of the cutting insert holder 20 in the cutting insert holder 20. On the one hand, the guide recess 44 accordingly runs perpendicular to the guide recess 14 provided in the main part 12 and, on the other hand, perpendicular to the rotational axis of the main part 12. The guide recess 44 provided in the cutting insert holder 20 preferably has a rectangular, in particular a square, cross section, so that a rotation of the adjusting device 22, for example, can be prevented in the guide recess 14. The same applies for the guide recess 14 provided in the main part 12, for example for protecting the cutting insert holder 12 against rotation, which then also has a rectangular or square cross section, respectively.

The adjusting device 22 has a setting element 46, which is preferably designed as axially moveable threaded sleeve, and a threaded drive comprising a drive spindle 48. The axial movability of the threaded sleeve 46 is understood to be a movability along the longitudinal axis of the guide recess 44, i.e. perpendicular to the rotational axis of the main part 12 and perpendicular to the direction of movement of the cutting insert holder 20. The threaded drive preferably further comprises a stationary threaded bushing (also referred to as bearing bushing), which is preferably arranged tightly in the guide recess 44, i.e. so as to be secured against rotation and immovably, namely preferably on an end of the guide recess 44, which is spaced apart from a threaded sleeve. For the tight anchoring, the threaded bushing 50 can be anchored in the guide recess 44 in the cutting insert holder 20, for example in a rotationally and axially fixed manner by means of a press fit, soldering, adhesion or the like. The threaded sleeve 46 and the threaded bushing 50 preferably have a rectangular, in particular square outer circumference according to the guide recess 44.

The drive spindle is preferably designed as differential threaded spindle 48 (also referred to as differential threaded screw) and has a first threaded portion 48*a* and a second threaded portion 48*b*. The first threaded portion 48*a* is screw-connected to a threaded bore, which is not identified in more detail, of the threaded sleeve 46, while the second threaded portion 48*b* is screw-connected to a threaded bore, which is not identified in more detail, of the threaded bushing 50. The first threaded portion 48*a* and the second threaded portion 48*b* have dissimilar thread pitches (leads), but identical thread directions (lead directions). In response to a rotational actuation of the differential speed spindle 48, the threaded sleeve 46 thus moves along the spindle axis, which is not identified in more detail, of the differential threaded spindle 48 by a distance, which corresponds to the difference in pitch of the two threaded portions 48*a*, 48*b* of the differential threaded spindle 48. The spindle axis extends perpendicular to the direction of movement of the cutting insert holder and perpendicular to the rotational axis of the main part 12. Due to the difference in pitch, the threaded sleeve 46 can be moved very precisely by rotating the differential threaded spindle 48. The thread pitches of the threaded portions 48*a*, 48*b* can thus for example be defined in such a way that the threaded sleeve 46 is moved by 0.1 mm per rotation of the differential threaded spindle 48. For a movement of this type, the threaded bushing 50 can in particular have a pitch slope of 5.75°. A lubricant supply, which is not illustrated, can be assigned to the adjusting device 22 or to the differential threaded spindle 48 thereof, respectively.

For the rotational actuation, the drive spindle or the differential threaded spindle 48, respectively, is connected on its end, which is spaced apart from the threaded bushing, to an actuating element 52 in a rotationally fixed manner, but such that it can move in the axial direction. The actuating element 52 preferably comprises a scale ring 54 (see FIG. 4) and is rotatably mounted at the beginning in the guide recess 44 in the main part 16, preferably via a spring ring 56. To receive the actuating element 52, the guide recess 44 is preferably widened according to the cross section of the actuating element 52. The actuating element 52 can be accessed from outside the main part 12, for example with the help of a suitable tool. The main part 12 has a corresponding notch 58, which is open to the outside. As suggested in FIG. 4, the scale ring 44 can have, for example, 10 marks/markings, so that a feed/setting accuracy of, for example, 0.001 mm, can be attained in the semidiameter.

The setting element, which is in particular formed as threaded sleeve 46, has a control slope 60, on which the cutting insert holder 20 is supported on the setting rod 16. For this purpose, an opening, which is not identified in more detail, and from which the control slope 60 protrudes and comes to rest on the setting rod 16, is provided in the guide recess 44 in the direction of the setting rod 16. The setting element, which is preferably formed as threaded sleeve 46, can comprise a radially protruding/cantilevered cantilever element 62, which can be, but does not have to be, formed in one piece with the remaining setting element 46, and which protrudes through the opening, which is not identified in more detail, in the guide recess 44 and which is supported with its control slope 60 on the setting rod 16. The control slope 60 forms an oblique angle, in particular an acute angle, with the rotational axis of the differential threaded spindle 48.

To insert the adjusting device 22, which is provided with the cantilever element 62, a notch 70, which extends perpendicular to the direction of movement of the cutting insert holder 20 and perpendicular to the rotational axis of the main part 12, and which is open towards the side wall of the cutting insert holder 20 located opposite the guide recess 14 and towards the clearance 19 on its opposite side, is provided in the cutting insert holder 20. Viewed in the direction of movement of the cutting insert holder 20, the notch 70 is dimensioned sufficiently to receive the cantilever element 62 or the portion thereof, which protrudes beyond the threaded sleeve 46, respectively, in response to an insertion of the adjusting device 22 into the cutting insert holder 20, in particular in response to the production thereof.

If the differential threaded spindle 48 is now rotated by means of the actuating element 52, the setting element in the form of the threaded sleeve 46 moves along the rotational axis/spindle axis of the differential threaded spindle 48. The control slope 60 of the setting element 46 or of the cantilever element 62, respectively, thereby also moves along the rotational axis/spindle axis of the differential threaded spindle 48, namely on the setting rod 16, which does not move in the transverse direction. The cutting insert holder 20, which is supported on the setting rod 16 via the control slope 60, is prevented from a movement along the rotational axis of the differential threaded spindle 48 by means of the positive arrangement of the cutting insert holder 20 in the guide recess 14, and is moved in the guide recess 14 in response to the movement of the control slope 60 along the spindle axis due to its spring-loaded mounting perpendicular to the rotational axis of the differential threaded spindle 48 and also perpendicular to the rotational axis of the main part 12, so that the cutting element 24 is moved either away from the main part 12 in the radial direction or towards the latter (or, depending on the design, even into it). This radial movement advantageously takes place without a rotation of the cutting element 24 or of the cutting insert thereof, respectively, about the rotational axis of the main part 12, so that a (more) precise setting of the cutting element 24 or of the cutting insert thereof, respectively, can be attained.

The adjusting device 22 can in particular be used for a presetting of the position of the (respective) cutting insert holder 20 in relation to the setting rod 16 in response to the production of the cutting tool 10 according to the invention. For example in the case of a cutting insert wear during the use of the cutting tool 10, a readjustment is further possible by means of the adjusting device 22, without the cutting insert holder 20 having to be removed from the cutting tool 10 for this purpose.

Due to the integration of the adjusting device 22 in the cutting insert holder 20 and the orientation of the adjusting device 22 perpendicular to the rotational axis of the main part 12 and perpendicular to the direction of movement of the cutting insert holder 20, an adjustable cutting insert holder 20 is obtained, which is designed compactly and which is characterized by a short expansion, in particular in the longitudinal direction of the cutting tool 10, so that a number of cutting insert holders 10, which is large as compared to the prior art and which can in particular preform different, preferably all machining steps required for the machining of a workpiece (e.g. roughing, semi-finishing, finishing, providing a bezel on both sides).

It goes without saying that modifications of the above-described exemplary embodiment are possible, without leaving the basic idea of the invention, which is defined by the claims.

In the shown embodiment, the setting element, which is preferably designed as threaded sleeve, is supported directly on the setting rod. In the alternative, at least one further pressure-transferring element can be arranged between the setting element and the setting rod.

In the shown embodiment, each cutting insert holder is supported on the setting rod, which is guided in the main part of the cutting tool such that it can be axially moved. When the cutting tool does not have a setting rod, however, the setting element can be supported directly or indirectly on a control surface, which is provided in the main part, for example on an in particular rounded bottom surface.

In the shown embodiment, the axial movement of the setting rod takes place fluidically, in particular by applying cooling lubricant pressure to the piston, which is located on the interface-side end of the cutting tool and which is supported on the main part via a compression spring. In the alternative, an axial movement of the setting rod can also be introduced hydraulically, pneumatically, electromotively or electromagnetically. For this purpose, the cutting tool can have a setting drive, which operates hydraulically, pneumatically, electromotively or electromagnetically and which axially drives the setting rod.

Apart from a machining of a bearing tunnel, the cutting tool according to the invention can be used for any finishing or fine machining of a bore to a predetermined nominal diameter. The cutting tool according to the invention can thus also be used for machining a piston bore in a cylinder crankcase or the like. It may be sufficient in this case, when the cutting tool only has a single cutting insert holder.

In the case of the shown embodiment, as it is illustrated in particular in FIGS. 1, 2, and 4, several cutting insert holders or cutting elements, respectively, are further arranged at predetermined axial distances along the main part of the cutting tool in a row. However, the arrangement in a row is not mandatory. The cutting insert holders arranged at the predetermined axial distances can be arranged offset from one another in the circumferential direction, for example helically, wherein adjusting devices or setting elements, respectively, which are assigned to the several cutting insert holders, are then oriented/arranged perpendicular to the direction of movement of the cutting insert holder assigned to them. Due to the arrangement, which is offset in the circumferential direction, the axial distances between the cutting insert holders can be further shortened, depending on the field of application of the cutting tool, so that even more cutting insert holders can be arranged on the main part. An arrangement, which is offset in the circumferential direction, thus offers a larger design flexibility.

The invention claimed is:

1. A cutting tool comprising a main part, which is capable of being rotationally driven about a rotational axis, at least first and second cutting insert holders arranged on the main part such that the first and second cutting insert holders are capable of being radially set, and a setting device for setting a position of the first and second cutting insert holders relative to the main part, wherein the first cutting insert holder is arranged in a first guide recess in the main part and the second cutting insert holder is arranged in a second guide recess in the main part, such that the first and second cutting insert holders are capable of being moved transversely to the rotational axis, and the setting device comprises a setting rod, which is arranged in the main part such that the setting rod is capable of being moved axially, and the setting rod supports the first and second cutting insert holders, and the setting rod is shaped such that axial displacement of the setting rod causes radial displacement of the first and second cutting insert holders, the cutting tool further comprises an adjusting device, which is integrated in the first cutting insert holder, the adjusting device comprises a setting element and a threaded drive, the setting element comprises a control slope that is supported on the setting rod, and rotating the threaded drive about a threaded drive axis displaces the setting element relative to the first cutting insert holder, thereby displacing the control slope transversely relative to the rotational axis and transversely relative to the setting rod, the threaded drive axis being offset from the rod, the control slope being shaped so that said displacing the control slope adjusts the position of the first cutting insert holder radially in relation to the setting rod.

2. The cutting tool according to claim 1, wherein the first cutting insert holder is received so as to be secured against rotation in the first guide recess.

3. The cutting tool according to claim 1, wherein the first guide recess and an adjacent space together form a through bore.

4. The cutting tool according to claim 1, wherein the first cutting insert holder has an axial aperture, in which the setting rod is received.

5. The cutting tool according to claim 1, wherein the first cutting insert holder is supported elastically in relation to the main part.

6. The cutting tool according to claim 1, wherein the setting rod is connected to a piston element, which is arranged in a pressure chamber in the main part.

7. The cutting tool according to claim 6, wherein the piston element is supported elastically in relation to the main part.

8. The cutting tool according to claim 1, wherein:
the setting element comprises a threaded sleeve, and the first cutting insert holder is supported on the setting element, and
the threaded drive is screw-connected to the threaded sleeve and is mounted on the first cutting insert holder.

9. The cutting tool according to claim 8, wherein:
the cutting tool comprises a threaded bushing, which is secured in the first cutting insert holder at a distance from the threaded sleeve, and
the threaded drive comprises differential threads, the differential threads comprise a first threaded portion and a second threaded portion, the first threaded portion is screw-threaded to the threaded sleeve, and the second threaded portion is screw-threaded to the threaded bushing.

10. The cutting tool according to claim 9, wherein a compression spring is arranged between the threaded sleeve and the threaded bushing.

11. The cutting tool according to claim 9, wherein:
the adjusting device has an actuating element,
the actuating element is held on the first cutting insert holder such that the actuating element is capable of being rotationally moved, and
the actuating element is connected to the differential threaded spindle in a rotationally fixed manner and such that the actuating element is capable of being moved in the direction of movement of the threaded sleeve.

12. The cutting tool according to claim 1, wherein each of the at least first and second cutting insert holders is capable of being moved synchronously via the setting rod.

13. The cutting tool according to claim 1, wherein the cutting tool further comprises a third cutting insert holder.

14. The cutting tool according to claim 13, wherein:
the cutting tool comprises at least one non-adjustable cutting insert holder in that it does not have the adjusting device.

15. The cutting tool according to claim 13, wherein in the longitudinal direction of the cutting tool, the first cutting insert holder, the second cutting insert holder, and the third cutting insert holder are arranged in sequence.

16. The cutting tool according to claim 13, wherein, for each of one or more bearing webs that are to be machined, of a bearing tunnel, the cutting tool has at least two tool portions, which are adjacent in the longitudinal direction of the cutting tool.

17. The cutting tool according to claim 1, wherein the first cutting insert holder is supported in a spring-loaded manner in relation to the main part.

18. The cutting tool according to claim 13, wherein the third cutting insert holder has a third cutting insert holder adjusting device for adjusting the position of the third cutting insert holder in relation to the setting device.

19. A cutting tool comprising a main part, which is capable of being rotationally driven about a rotational axis, at least a first cutting insert holder arranged on the main part such that the first cutting insert holder is capable of being radially set, and a setting device for setting a position of the first cutting insert holder relative to the main part, wherein:
the first cutting insert holder is arranged in a first guide recess in the main part such that the first cutting insert holder is capable of being moved transversely to the rotational axis,
the setting device comprises a setting rod,
the setting rod is arranged in the main part such that the setting rod is capable of being moved axially, and the setting rod supports the first cutting insert holder, and the setting rod is shaped such that axial displacement of the setting rod causes radial displacement of the first cutting insert holder,
the cutting tool further comprises an adjusting device, which is integrated in the first cutting insert holder,
the adjusting device comprises a setting element and a threaded drive, the setting element comprises a control slope that is supported on the setting rod, and
rotating the threaded drive about a threaded drive axis displaces the setting element relative to the first cutting insert holder, thereby displacing the control slope transversely relative to the rotational axis and transversely relative to the setting rod, the threaded drive axis being offset from the rod, the control slope being shaped so that said displacing the control slope adjusts the position of the first cutting insert holder radially in relation to the setting rod.

* * * * *